United States Patent
Vyas et al.

(10) Patent No.: US 12,289,427 B2
(45) Date of Patent: Apr. 29, 2025

(54) SYSTEM AND METHOD OF EFFICIENT SELECTION OF EVALUATION FORM

(71) Applicant: NICE LTD., Ra'anana (IL)

(72) Inventors: Rahul Vyas, Rajasthan (IN); Pankul Gupta, Tarntaran (ID); Mayur Bhalke, Pune (IN); LeAnn Hopkins, Lake Worth/Wellington, FL (US)

(73) Assignee: NICE LTD., Ra'anana (IL)

( * ) Notice: Subject to any disclaimer, the term of this patent is extended or adjusted under 35 U.S.C. 154(b) by 84 days.

(21) Appl. No.: 18/350,130

(22) Filed: Jul. 11, 2023

(65) Prior Publication Data

US 2025/0039299 A1    Jan. 30, 2025

(51) Int. Cl.
*H04M 3/00* (2024.01)
*G06Q 10/0639* (2023.01)
*H04M 3/42* (2006.01)
*H04M 3/51* (2006.01)

(52) U.S. Cl.
CPC .... *H04M 3/5175* (2013.01); *G06Q 10/06398* (2013.01); *H04M 3/42221* (2013.01); *H04M 2203/402* (2013.01)

(58) Field of Classification Search
CPC .......... G06Q 10/06398; H04M 3/5175; H04M 3/42221
See application file for complete search history.

(56) References Cited

U.S. PATENT DOCUMENTS

2011/0007889 A1* 1/2011 Geffen ............. G06Q 10/06393
                                                        379/265.06
2017/0300499 A1* 10/2017 Lev-Tov ............. G06F 16/3329

* cited by examiner

*Primary Examiner* — Rasha S Al Aubaidi
(74) *Attorney, Agent, or Firm* — Haynes and Boone, LLP (57) ABSTRACT

Agent evaluation systems and methods, and non-transitory computer readable media, include receiving a recorded interaction between a customer and a contact center agent; retrieving or determining an interaction divergence range for each of a plurality of interaction parameters for the recorded interaction; calculating a form divergence determinant (FDD) score for each of a plurality of evaluation forms, wherein the lower the FDD score, the more suitable an evaluation form is for the recorded interaction; filtering out evaluation forms having an FDD score greater than a predefined threshold; ranking evaluation forms having an FDD score lower than the predefined threshold based on their FDD score; and providing a list of the ranked evaluation forms to a supervisor of the contact center agent.

20 Claims, 7 Drawing Sheets

SYSTEM AND METHOD OF EFFICIENT SELECTION OF EVALUATION FORM

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

TECHNICAL FIELD

The present disclosure relates generally to methods and systems for facilitating agent evaluations, and more specifically relates to methods and systems that determine the evaluation form best suited for a given interaction.

BACKGROUND

Evaluation is a critical functionality for any contact center organization to handle customer calls effectively and efficiently by their agents. It is important for the organization to provide the relevant evaluation form to evaluators for a given interaction handled by the agent. Less relevant evaluation forms provided to the evaluators do not help the organization or the agent understand the areas for improvement.

Today, mid-market to large market accounts have centralized quality teams supporting multiple lines of business. Each type of interaction often requires a different evaluation form so using an automatic form recommendation cuts down on the time it takes to find and select the correct form, which may take up to thirty (30) seconds per evaluation. New evaluators are often not sure about the right quality of evaluation forms for an interaction, and the form typically needs to be changed.

Generally, the group of evaluation forms are prepared by the organization, but the selection of the specific evaluation form is a manual task for the manager for a given interaction handled. Also, the shortcoming of the typical quality planner system is that it only has one form that is provided to all the evaluators associated with the quality plan. This single form is not sufficient to qualify as the best form for all the agents or evaluators, or for all customer interactions. Thus, evaluators need to manually identify the suitable form from the repository and change the existing form, which is a time-consuming task.

Moreover, in large accounts with a minimum of six (6) lines of business, the quality team is often a shared resource. The quality team is therefore short-staffed and is often rushing to complete their evaluation count. This can lead to selecting the wrong form, the agent and supervisor disputing the evaluation because it is on the wrong form, and then the evaluator having to delete the evaluation and later re-evaluating using the correct template.

On average, this error tends to occur in about 10% of the total evaluations in a month. Having the recommended form populated can cut down on this inefficiency and lack of credibility in the quality team experiences, and improve feedback and further training recommendation(s).

Accordingly, what is needed is a system that can provide a manager with suggestions for the evaluation form best suited for a given interaction. This automates the selection of the most accurate form, thereby reducing manual intervention by the evaluator to choose the correct form while also driving down errors in form selection for the evaluator's use.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

This description and the accompanying drawings that illustrate aspects, embodiments, implementations, or applications should not be taken as limiting-the claims define the protected invention. Various mechanical, compositional, structural, user interface, electrical, and operational changes may be made without departing from the spirit and scope of this description and the claims. In some instances, well-known circuits, structures, on-screen arrangements, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The present invention derives the ranking of evaluation forms best suited for a recorded interaction and provides such suggestions to a supervisor (also referred to herein as an evaluator or a manager) during evaluation task assignment. In one or more embodiments, an agent interaction is selected for evaluation either manually or automatically by a quality planner application. A list of available evaluation forms is retrieved and values of interaction parameters for the evaluation forms are compared to an interaction divergence range for the same interaction parameters for the agent interaction.

In particular, a form assessment consolidation module (FACM) evaluates the relevant evaluation form best suited for a recorded interaction, and calculates the form divergence determinant (FDD) score for the evaluation form as further discussed below. The FDD score is compared with a threshold score to determine whether the form is sufficiently suitable and should be used to evaluate the recorded interaction. The less the FDD score, the more suitable the evaluation form for the recorded interaction. Additionally, a filtration module filters out unnecessary evaluation forms from the quality processes.

The present systems and methods assist managers and supervisors by providing the relevant evaluation form for an interaction handled by an agent, and avoids time wasted on searching for evaluation forms suitable for the interaction. Advantageously, the present invention eliminates the limitation of the managers selecting only one form during quality plan creation. Instead, distributed interactions can use the FACM to provide qualified evaluation forms during the time of interaction distribution, which avoids time wasted by the evaluators searching for, considering and selecting, and often then changing, the qualified form. The present invention provides a relevant evaluation form, which results in timely evaluation and improved efficiency for the evaluators.

In various embodiments, a recorded interaction is sent to the FACM, and the FACM determines if a previous interaction divergence range was calculated for certain interaction parameters of the recorded interaction. If it was calculated earlier, then no further calculation for the same interaction is performed. If the range was not calculated earlier, then the FACM calculates the interaction divergence range and updates it inside the interactions divergence datastore so it can be used afterwards. In some embodiments, a time stamp is associated with the recorded interaction and the interaction divergence range. The FACM then queries evaluation form datastore to obtain all the evaluation forms. The FACM checks the interaction rules associated with each evaluation form and compares the rules against the interaction divergence range. Once a good match is found, the list of evaluation forms is filtered out by the filtration module, and the correct (or most suitable) evaluation form(s) are provided to the evaluators for the quality management process. In some embodiments, a single evaluation form, which represents the best match, is provided to an evaluator.

In several embodiments, the data flow through the FACM includes data accumulation, data analyzing, and data processing. During data accumulation, the evaluation form selection rules for individual forms are provided to the FACM. A stream processing application may be used to send the selection rules to the FACM whenever a new interaction is recorded. The stream processing application can be utilized by any cloud managed platform, such as Amazon Web Services (AWS) kinesis stream.

During data analyzing, the FACM identifies whether an interaction divergence range needs to be calculated or not. If the interaction divergence range has previously been calculated, then the evaluation form selection rules and the interaction divergence range are sent to data processing. If the interaction divergence range has not yet been calculated, then confidence interval techniques may be used to determine the range. During data processing, the FACM compares the evaluation form selection rules with the interaction divergence range to calculate the relevant FDD score.

Figure 1:
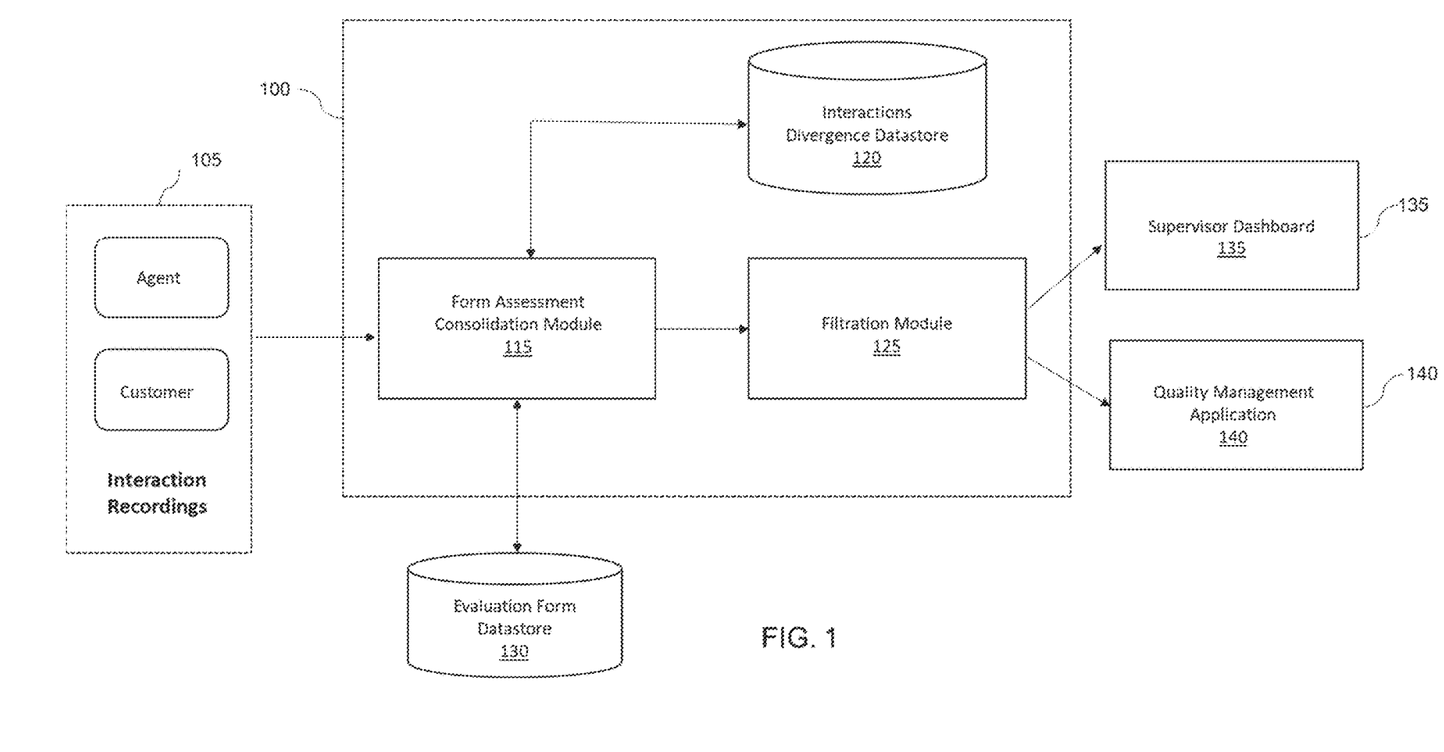
FIG. 1 is a simplified block diagram of an agent evaluation system according to various aspects of the present disclosure.

FIG. 1 illustrates a block diagram of an exemplary agent evaluation system 100 according to embodiments of the present disclosure. The system 100 includes FACM 115, interactions divergence datastore 120, and filtration module 125. The FACM 115 receives and evaluates interaction metadata from interaction recording 105, identifies whether an interaction divergence range for a recorded interaction needs to be calculated, calculates the interaction divergence range if needed, and calculates the FDD score. The lower the FDD score, the more suitable an evaluation form is for the recorded interaction. A higher FDD score indicates a lower suitability of the evaluation form.

Initially, a manager or supervisor configures evaluation form selection rules based on various interaction parameters. Each evaluation form is associated with its own form selection rules. Exemplary relevant interaction parameters may include interaction categories, skills associated with the interaction, call reason tag associated with the interaction, behavioral ranking of the interaction, interaction duration, interaction complexity, interaction channel type, agent sentiment, customer sentiment, or customer feedback for the interaction, or any combination of the foregoing. These parameters can be configured by the manager or supervisor during creation of evaluation forms. The form selection rules are saved in evaluation form datastore 130.

Once the form selection rules are set, when a recorded interaction 105 is received, it is passed to the FACM 115. The FACM 115 first queries the interactions divergence datastore 120 to check whether the interaction divergence range for the recorded interaction 105 for a particular interaction parameter was previously calculated or not. If it was calculated, then no further calculation for the same interaction is required. If it was not calculated, then the FACM 115 calculates the interaction divergence range for the interaction parameter and updates it inside the interactions divergence datastore 120.

Next, the FACM 115 queries the evaluation form datastore 130 to obtain all the evaluation forms. The FACM 115 compares the values of the interaction parameters associated with each evaluation form with the interaction divergence range of each interaction parameter. Specifically, the FACM 115 calculates the relevant FDD score for each evaluation form. In various embodiments, the FDD score is the weighted sum of the variations of the interaction parameters of the different evaluation forms in comparison to the interaction divergence range for the interaction parameters.

If the FDD score is less than or equal to a predefined threshold (e.g., one), filtration module 125 passes the evaluation form to one or more quality management processes. Quality management processes include providing an evaluation form (or a list of evaluation forms) to a supervisor dashboard 135 or to a quality management application 140. Supervisor dashboard 135 provides a user interface to an evaluator to assess the performance of contact center agents. Quality management application 140 is a tool used to assign an interaction to an evaluator.

Figure 2:
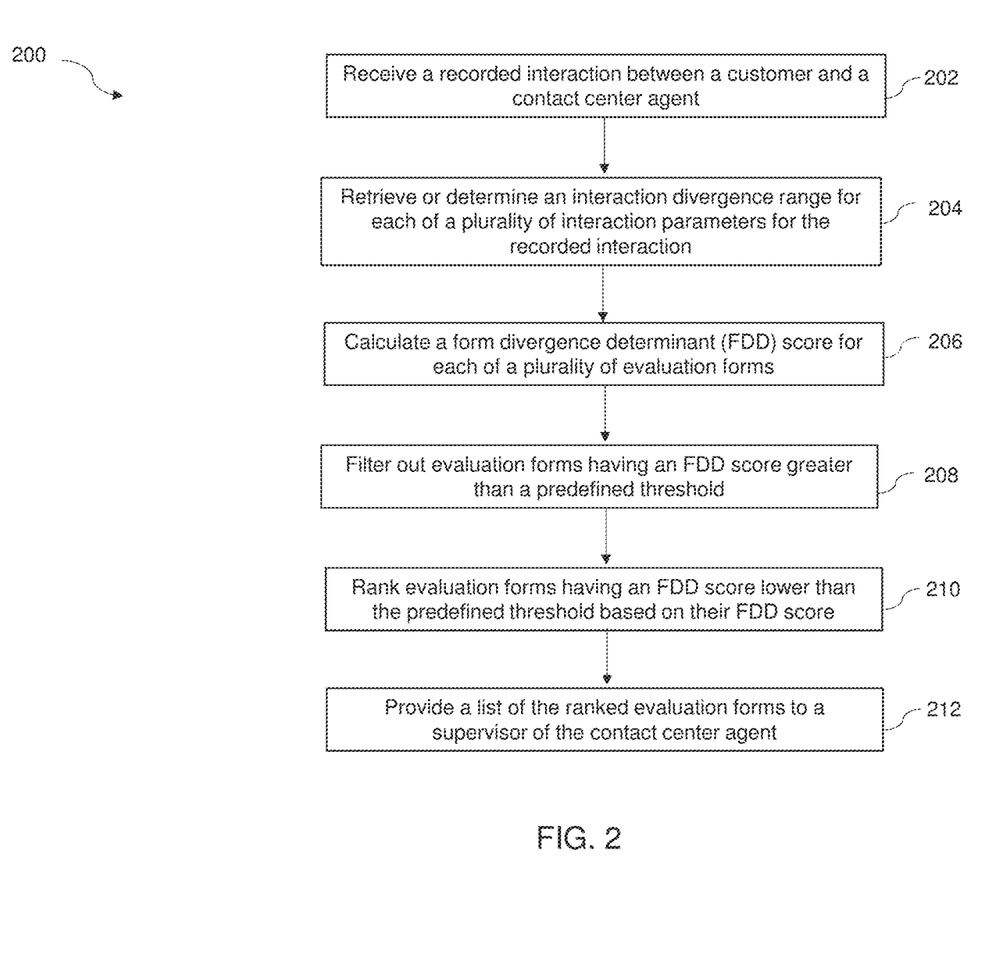
FIG. 2 is a flowchart of a method according to embodiments of the present disclosure.

Referring now to FIG. 2, a method 200 according to embodiments of the present disclosure is described. At step 202, the FACM 115 receives a recorded interaction between a customer and a contact center agent. At step 204, the FACM 115 retrieves or determines an interaction divergence range for each of a plurality of interaction parameters for the recorded interaction. The FACM 115 can retrieve the interaction divergence range from interactions divergence datastore 120. In other embodiments, the FACM 115 determines the interaction divergence range, as will be explained in more detail below with respect to FIG. 4.

In various embodiments, calculating the interaction divergence range includes calculating a confidence interval estimate for each of the various interaction parameters or factors. Confidence interval estimates are helpful to minimize the variation of the data points of ranking of evaluation forms across the contact center, and the solution can be validated against various values of the confidence level (e.g., 90%, 95%, or 99%).

In some embodiments, the interaction parameters include one or more of an interaction category, a skill associated with the interaction, a call reason, a behavioral ranking, an interaction duration, an interaction complexity, an interaction channel type, an agent and customer sentiment, and a customer feedback. An interaction category includes whether an agent greeted a customer and whether the agent behaved properly during the conversation or not. Based on these criteria, a certain category is tagged once the interaction is recorded. The skill associated with the interaction signifies the skills of the agent handling the interaction such as finance expert, telecommunication, or banking. The call reason signifies the post-call work disposition or call reason comments added by an agent once the interaction is over. Such call reason is typically tagged to the interaction metadata. There are several behavioral aspects that can be captured during the interaction, such as effective questioning, talking slowly, and showing empathy. For each behavioral aspect, the ranking score can be assigned to the agent on any given scale. The interaction duration is the amount of time taken by the customer and agent for the given interaction. The interaction complexity signifies the complexity of the query being asked by the customer. In various embodiments, interaction complexity can be in the critical, high, medium, or low range. The interaction channel type signifies the channel or medium used during the call such as a phone or digital channel (Viber, WhatsApp, etc.). Sentiment analytics is used to determine the sentiment of any person on any given scale, and determine the sentiment of the person. Usually sentiment is defined as positive, negative, mixed, or neutral. Customer feedback refers to a customer satisfaction score (e.g., net promoter score) given by the customer for the interaction handled by the agent.

The interaction parameters can be configured by the manager or supervisor during the creation of the evaluation form. The interaction parameters are generally the metadata of the interactions. The manager or supervisor can carefully choose certain metadata and configure the evaluation form.

Figure 3A:
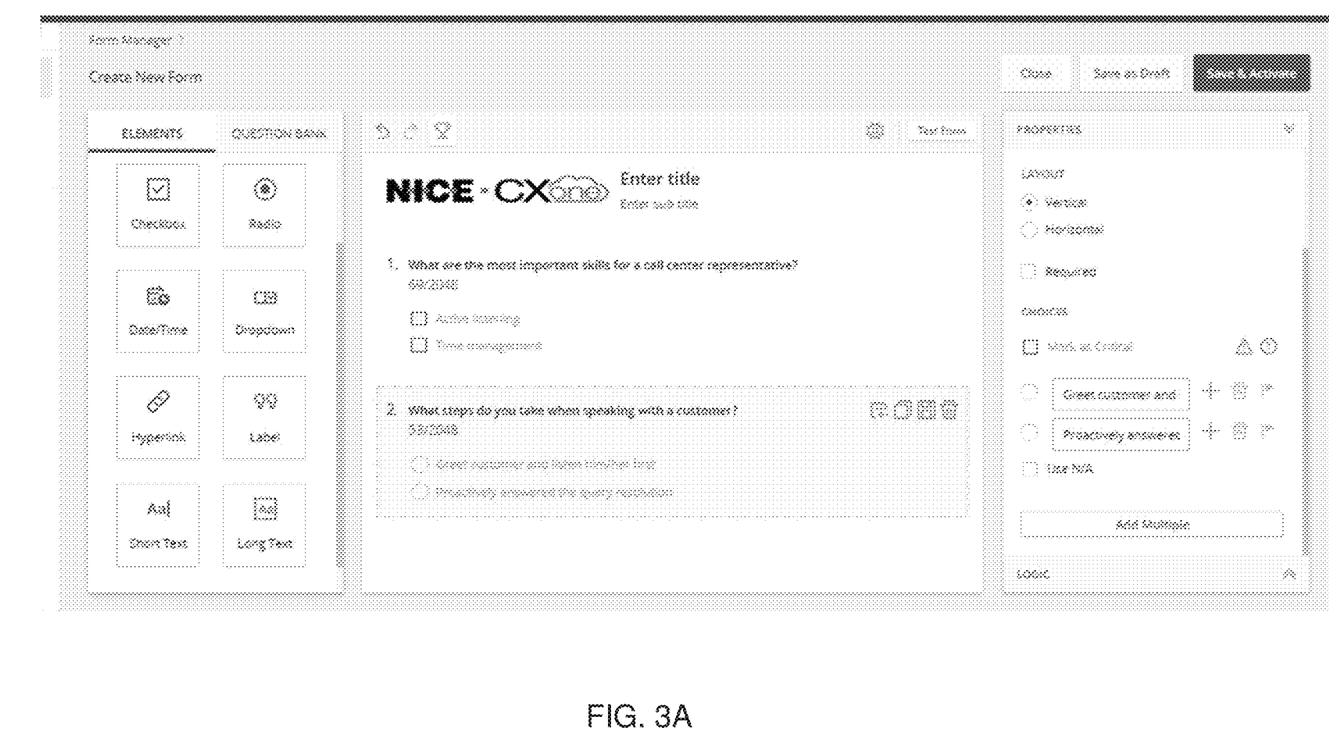
FIGS. 3A and 3B each illustrate a user interface showing configuration of an evaluation form according to embodiments of the present disclosure.
Figure 3B:
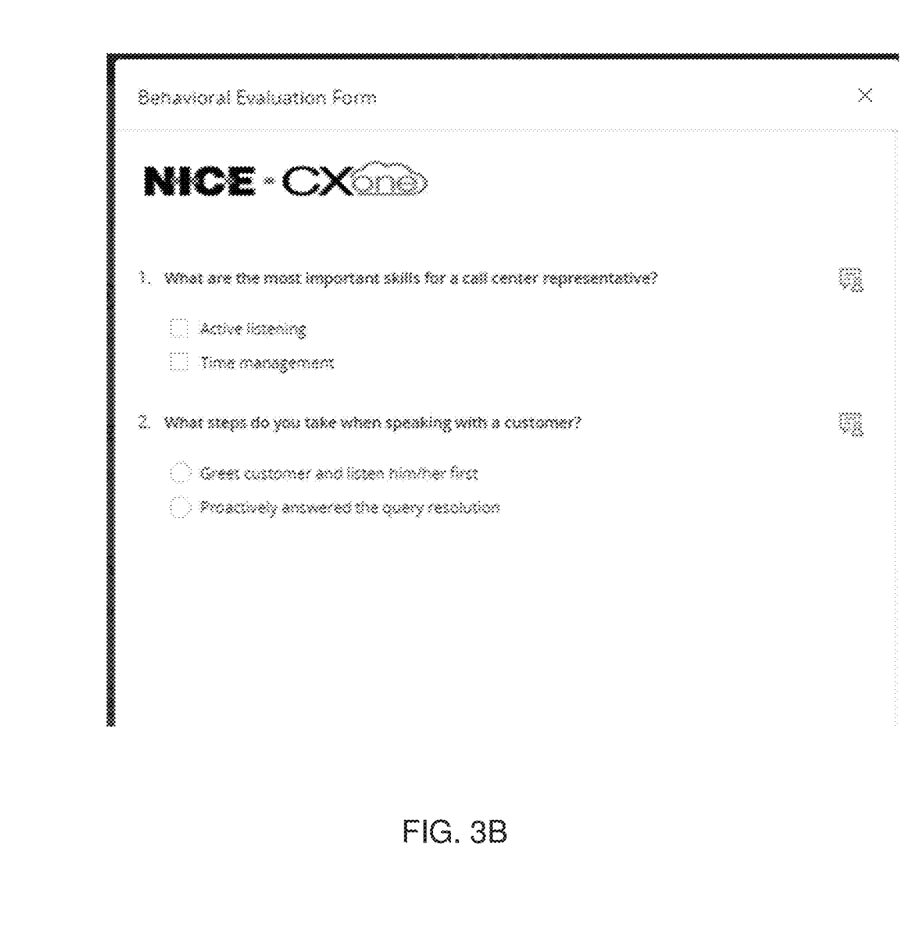

FIGS. 3A and 3B each illustrate a user interface showing how different evaluation forms can be configured by a supervisor. The evaluation forms can be built based on various quality questions in addition to the user interface shown in FIGS. 3A and 3B. For example. "How would you describe the role of a call center representative?" "What are the most important skills for a call center representative?" "How do you define quality customer service" "What steps do you take when speaking to a customer?"

In certain embodiments, method 200 includes receiving evaluation form selection rules from the supervisor. The evaluation form selection rules include a value for each of the plurality of interaction parameters associated with each of the plurality of evaluation forms. The evaluation form selection rules are saved, in some embodiments, in evaluation form datastore 130.

In certain embodiments, the evaluation form selection rules are stored as shown below in Table 1. Here, each form is associated with its form selection rule. For example, Form 1 is associated with rule IR1, and Form 2 is associated with rule IR2.

TABLE 1

EVALUATION FORM SELECTION RULE ASSOCIATION TABLE

| Form ID | Form Selection Rule |
| --- | --- |
| Form 1 | IR1 |
| Form 2 | IR2 |

The below is an exemplary data structure of the evaluation form selection rules.

Evaluation Form Selection Rules

```
{
    "form Id" : "Form-1"
    "form interaction association rule": {
        "behavioral": [{"BeEmpathatic": 5
        }, {"Active Listening": 4}],
        "sentiment": {
            "Customer Sentiment": "POSITIVE",
            "Agent Sentiment": "MIXED"
        },
        "categories": ["Credit Card", "Invoice"],
        "skills": ["OU Skills", "Guidance Skills"]
    }
}
```

In the present example, Form-1 is selected if and only if the interaction contains the following properties:

1. Behavioral rule: Interaction should contain the behavior as beEmpathatic score as 5 and Active listening as 4.
2. Sentiment rule: Interaction should contain the sentiment of call in which customer sentiment is positive and agent sentiment is mixed.
3. Category rule: Interaction should contain the category (ies) of calls in which interaction category was selected as credit card and invoice.
4. Skill rule: Interaction should contain those skill rules in which the given skill(s) was selected.

At step 206, the FACM 115 calculates a form divergence determinant (FDD) score for each of a plurality of evaluation forms. The FDD score is based on a value for each of the plurality of interaction parameters associated with each of the plurality of evaluation forms and the interaction divergence range for each of the plurality of interaction parameters for the recorded interaction. The lower the FDD score, the more suitable an evaluation form is for the recorded interaction.

In one or more embodiments, a value for each of the plurality of interaction parameters associated with each of the plurality of evaluation forms is retrieved, and a variation of the value from the interaction divergence range is determined for each of the plurality of interaction parameters. In one or more embodiments, the FDD score is the sum of the variations.

The below is an exemplary data structure of interaction metadata for the recorded interaction.

Interaction Metadata

```
{
    "leadingAgent" : "1eb0c54-7760-f080-95bd-0242ac110002",
        "agentSentiment" : null,
        "otherSentiment" : null,
        "sentimentMask" : null,
        "frustratedCustomer" : null,
        "feedback" : {
            "surveyMedium" : "EMAIL",
            "surveyScore" : "4",
            "normalizedScore" : "50",
            "surveyName" : "Survey 123",
            "responseReceivedTime" : "2023-05-03T05:27:09Z",
            "questionMinScale" : "1",
            "questionMaxScale" : "7"
        },
        "mediaState" : null,
        "behavioralMetrics" : null,
        "source" : "inContactACD",
        "externalSourceSegmentId" : null,
        "externalSourceContactId" : null,
        "segmentContactStartTime" : "2023-05-03T05:25:38Z",
        "startTime" : "2023-05-03T05:25:38Z",
        "endTime" : "2023-05-03T05:26:09Z",
}
```

The above interaction metadata properties provide the granular level details of the interaction for the day when it was recorded and stored inside interaction divergence datastore 120. As can be seen, the values for various interaction parameters are provided in the interaction metadata.

In various embodiments, a weight is assigned to each of the various interaction parameters, and the weight is applied to each variation before the sum is calculated. The FDD score is then the weighted sum of the variations of the interaction parameters in comparison with the interaction divergence range. Having the concept of weights included in making this determination allows adjustment of the significance of the interaction parameters in the calculation of the FDD score.

In one or more embodiments, to determine the variation, the value for an interaction parameter is first compared with the lower and upper bounds of the interaction divergence range. If the value is within the interaction divergence range, then the variation is considered zero. If the value is not within the interaction divergence range, then the difference between the lower and upper bounds of the interaction divergence range is calculated, the two differences are compared, and the minimum absolute difference is taken as the variation.

At step 208, filtration module 125 filters out evaluation forms having an FDD score greater than a predefined threshold. In several embodiments, the predefined threshold is set by the supervisor, and the method 200 includes receiving the predefined threshold from the supervisor. In an exemplary embodiment, filtration module 125 filters out a form when its FDD score is greater than one.

At step 210, filtration module 125 ranks evaluation forms having an FDD score lower than the predefined threshold based on their FDD score. At step 212, filtration module 125 provides a list of the ranked evaluation forms to a supervisor of the contact center agent. For example, filtration module 125 provides the list to supervisor dashboard 135 or quality management application 140 when the FDD score is less than or equal to one.

In several embodiments, method 200 further includes receiving a selection of one of the listed evaluation forms from the supervisor, and in response to the selection, providing the selected evaluation form to the supervisor.

Figure 4:
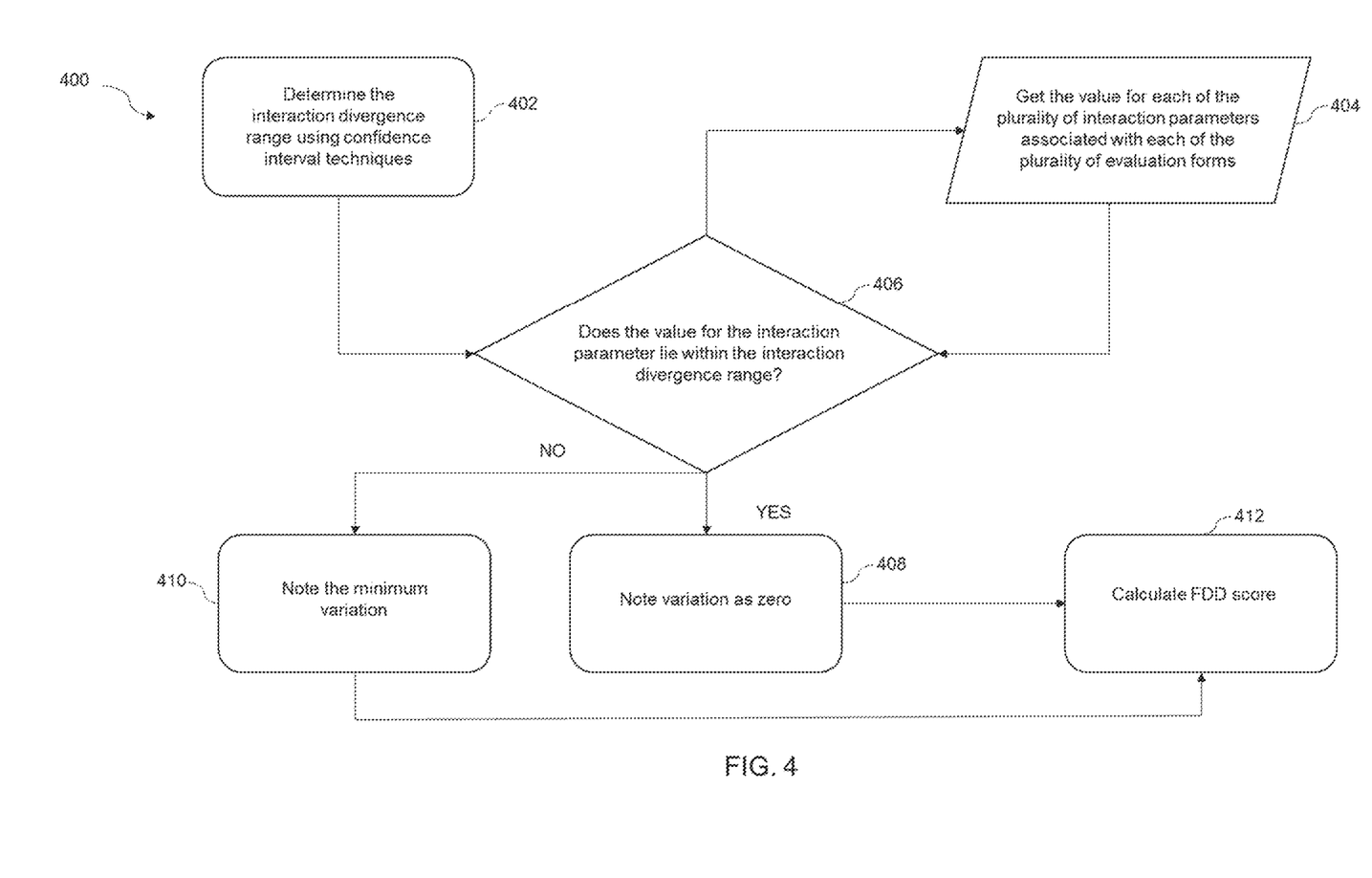
FIG. 4 illustrates a method for calculating an FDD score according to embodiments of the present disclosure.

Referring now to FIG. 4, a method 400 for calculating or determining an FDD score is shown. At step 402, the FACM 115 determines the interaction divergence range using confidence interval techniques.

In an exemplary embodiment, the FACM 115 calculates a confidence interval estimate for each of the interaction parameters. Confidence interval estimates can be calculated using the following formula:

$$\mu = \bar{x} \pm z \frac{\sigma}{\sqrt{n}}$$

Where:

μ=Confidence interval estimate x̄=Mean

Z=Confidence coefficient

σ=Standard deviation n=Sample size

Confidence intervals indicate the likely range of values of the population mean. For example, a 95% confidence interval indicates that one can be 95% confident that the interval contains the population mean. Confidence interval estimation considers the data size (volume of the data collected) and the potential variations in the data points to estimate the range.

When the mean is calculated, there is one estimate of the metric. Confidence intervals provide richer data and show the likely values of the true population mean. A point estimate (e.g., mean) does not reveal the uncertainty associated with the estimate as compared to the confidence interval estimates.

The data points or values collected to measure interaction parameters are continuous numbers; hence the probability of zero deviation against the point estimate is close to zero. The computation of a confidence interval is not a resource intensive process, and a confidence level can be changed to have greater confidence. Table 2 below provides the confidence coefficient (Z score) for specific confidence levels.

TABLE 2

CONFIDENCE LEVELS AND Z SCORES

| Confidence Level | Z Score |
|---|---|
| 90% | 1.645 |
| 95% | 1.960 |
| 99% | 2.576 |

The following is an example of calculating a confidence interval estimate. Assume the values of an interaction parameter for a recorded interaction are 5, 7, 8, 10, 12, 6, 5, 7, 7, and 8. The formula for calculating the confidence interval estimate is:

$$\mu = \bar{x} \pm z \frac{\sigma}{\sqrt{n}}$$

TABLE 3

EXAMPLE CALCULATION OF CONFIDENCE INTERVAL ESTIMATE

| Mean ($\bar{x}$) | Standard Deviation $\sigma = \sqrt{\frac{\Sigma(x-\text{mean})^2}{n-1}}$ | Z (Coefficient for 95% confidence level) | Confidence interval estimate ($\mu$) |
|---|---|---|---|
| 7.5 | 2.173 | 1.960 | 7.5 ± 1.34 |

Once the confidence interval estimate for an interaction parameter is determined, the FACM 115 receives a value of an interaction parameter for a plurality of evaluation forms in step 404. For example, if the interaction parameter of "interaction categories" is present, the value for this interaction parameter for one evaluation form can be 8.89 and the value for this interaction parameter for a second evaluation form can be 4.8. The FACM 115 selects one interaction parameter at a time, and selects another interaction parameter if it is present until all the interaction parameters are evaluated.

At step 406, the FACM 115 determines if the value for the interaction parameter of the evaluation form lies within the interaction divergence range. In various embodiments, the FACM 115 determines a variation of the confidence interval estimate for the value of the interaction parameter from the value of the interaction parameter for each of the evaluation forms. For example, if the confidence interval estimate for the interaction parameter of "behavioral scores for the interactions" for the recorded interaction is 2.5±1.44 and the value for the "behavioral scores for the interactions" for one evaluation form is 2, then the variation is 0. The value (2) is compared with the lower bound (2.5−1.44=1.06) and upper bound (2.5+1.44=3.94) of the confidence interval estimate to check if the value is within the range. If the value is within the confidence interval range, then the variation is considered to be zero as shown in step 408. In this case, because 2 is within the range of 1.06 and 3.94, the variation is zero. If the value is not within the confidence interval range, then the difference of the value against the lower bound and upper bound of the confidence interval estimate is determined. The two differences are compared, and the minimum difference is taken as the variation in step 410. Once the variation is determined, a sum of the variations is determined, and the FDD score is calculated in step 412.

The following mathematical formula depicts a calculation of the FDD score:

$$FDD = \sum_{1}^{n} \left\{ \begin{array}{c} \text{Let } k = \left\{ \begin{array}{l} 0 \text{ for}(\text{lower\_bound} \leq x \leq \text{upper\_bound}) \\ 1 \text{ Otherwise} \end{array} \right. \\ \left\{ \begin{array}{l} 0 \text{ for } k == 0 \\ w * \left\{ \begin{array}{l} (\text{lower\_bound} - x) \text{ for}(x < \text{lower\_bound}) \\ (x - \text{upper\_bound}) \text{ for}(x > \text{lower\_bound}) \end{array} \right| \text{Otherwise} \end{array} \right. \end{array} \right\}$$

where:

x=a value of an interaction parameter k=temporary variable n=number of values of an interaction parameter lower_bound and upper_bound: minima and maxima of confidence interval estimate w: weight (initial value−1)

Tables 4 and 5 below illustrate how to use a confidence interval estimate to derive a FDD score, and how to use the FDD score.

TABLE 4

VARIATION CALCULATIONS

| Interaction Parameter | Confidence Interval Estimate | Value for Interaction Parameter - Evaluation Form 1 | Value for Interaction Parameter - Evaluation Form 2 | Variation for Evaluation Form 1 | Variation for Evaluation Form 2 |
|---|---|---|---|---|---|
| Interaction categories present | 7.5 ± 1.34 | 8.89 | 4.8 | 0.05 | 1.36 |
| Skills of the interactions | 1.5 ± 0.55 | 3 | 4 | 0.95 | 1.95 |
| Behavioral scores for the interactions | 2.5 ± 1.44 | 2 | 4 | 0 | 0.06 |
| Business data rules for the interactions | 2.7 ± 1.14 | 3 | 0 | 0 | 1.56 |

TABLE 5

USING THE FDD SCORE

| Evaluation Form | FDD score = $\Sigma$variations | Inference |
|---|---|---|
| Form 1 | 1 | Form divergence is low hence this is the best suitable form for the given interaction selected for evaluation. |
| Form 2 | 4.93 | Form divergence is very high hence such form is not suitable to select for evaluation. |

Once the interaction divergence range is calculated, all the evaluation forms are checked to try to find the most suitable evaluation form. In the above example, there are two evaluation forms—evaluation form 1 and evaluation form 2. The values for the interactions parameters of evaluation form 1 and evaluation form 2 are compared with the confidence interval estimate for the respective interaction parameter. If the value lies within the confidence interval estimate, then the variation is considered zero. If the value does not lie within the confidence interval estimate, then the minimum variation is taken. This process is repeated for evaluation form 2. Once all the variations are calculated, the variations for each form are added to yield the FDD score. The organization can decide the threshold score of the FDD score. If the FDD score is below the threshold score, then the form(s) associated with the lowest FDD score(s) can be selected and assigned to an evaluator.

In an exemplary embodiment, the FACM 115 also assigns a weight to each interaction parameter, and the FDD score is the sum of the weighted variations. In some embodiments, each interaction parameter has an assigned weight of one.

Figure 5:
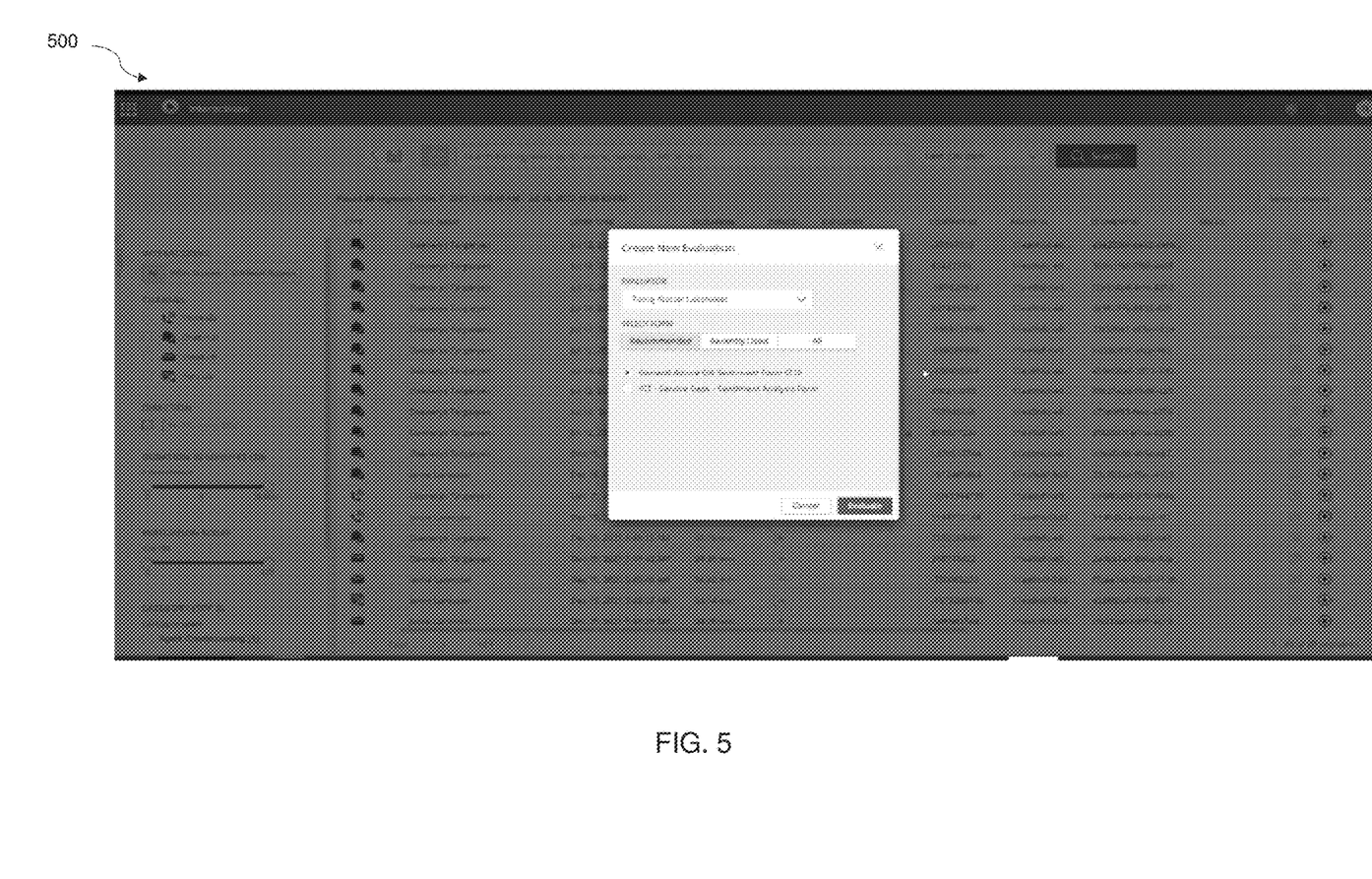
FIG. 5 illustrates an exemplary interface showing suggestions of evaluation forms according to embodiments of the present disclosure.

FIG. 5 illustrates a user interface 500 that shows supervisors receiving quick suggestions for qualified evaluation forms while starting ad hoc evaluations. In the past, managers and supervisors were not typically getting the best evaluation form when picking the evaluation forms manually. With the help of the FACM 115 and the present disclosure, supervisors now receive a suggestion of the best suitable form(s) to evaluate a given recorded interaction.

Figure 6:
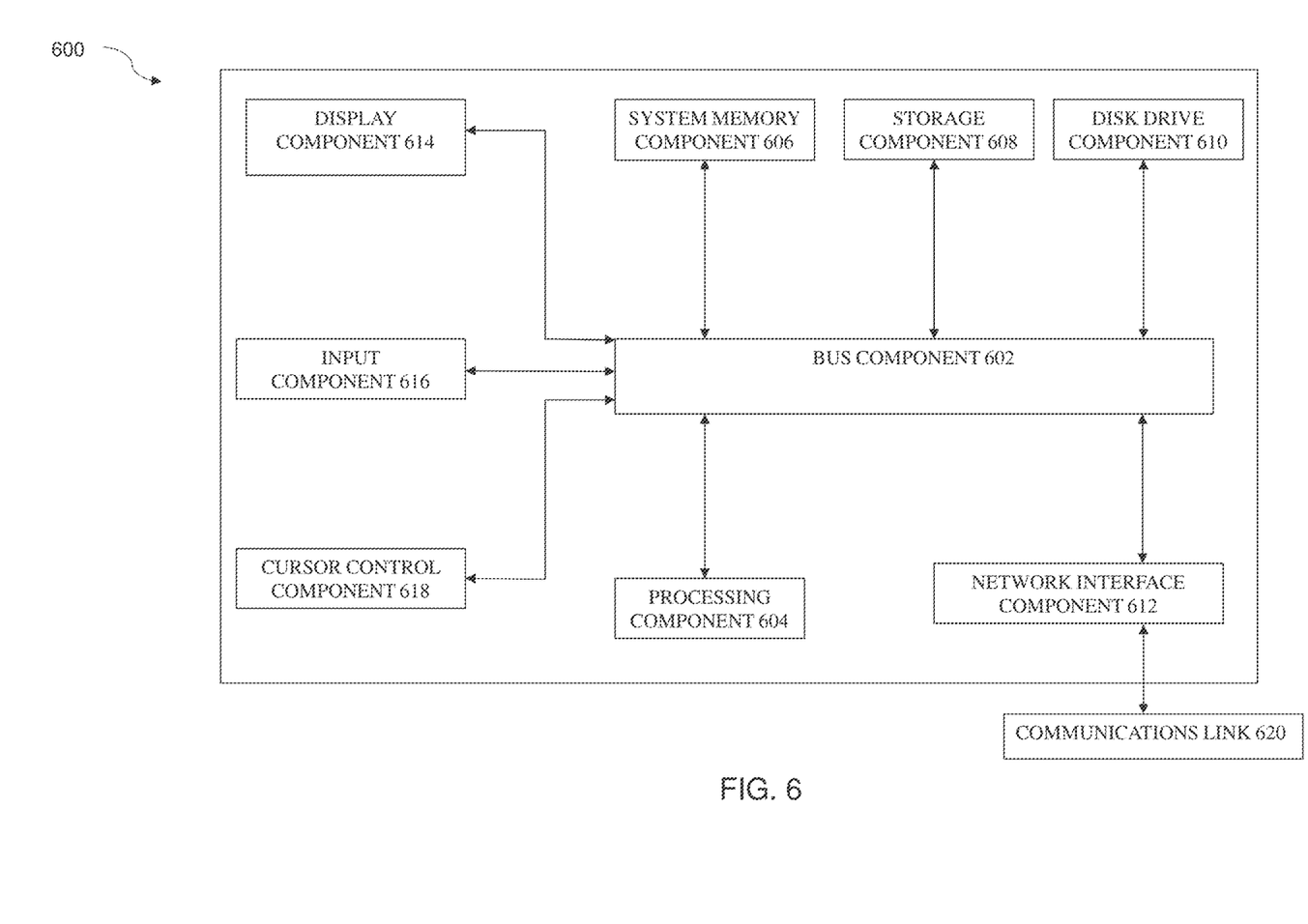
FIG. 6 is a block diagram of a computer system suitable for implementing one or more components in FIG. 1 according to one embodiment of the present disclosure.

Referring now to FIG. 6, illustrated is a block diagram of a system 600 suitable for implementing embodiments of the present disclosure. System 600, such as part a computer and/or a network server, includes a bus 602 or other communication mechanism for communicating information, which interconnects subsystems and components, including one or more of a processing component 604 (e.g., processor, micro-controller, digital signal processor (DSP), etc.), a system memory component 606 (e.g., RAM), a static storage component 608 (e.g., ROM), a network interface component 612, a display component 614 (or alternatively, an interface to an external display), an input component 616 (e.g., keypad or keyboard), and a cursor control component 618 (e.g., a mouse pad).

In accordance with embodiments of the present disclosure, system 600 performs specific operations by processor 604 executing one or more sequences of one or more instructions contained in system memory component 606. Such instructions may be read into system memory component 606 from another computer readable medium, such as static storage component 608. These may include instructions to receive a recorded interaction between a customer and a contact center agent; retrieve or determine an interaction divergence range for each of a plurality of interaction parameters for the recorded interaction; calculate a form divergence determinant (FDD) score for each of a plurality of evaluation forms, wherein the FDD score is based on a value for each of the plurality of interaction parameters associated with each of the plurality of evaluation forms and the interaction divergence range for each of the plurality of interaction parameters for the recorded interaction, and wherein the lower the FDD score, the more suitable an evaluation form is for the recorded interaction; filter out evaluation forms having an FDD score greater than a predefined threshold; rank evaluation forms having an FDD score lower than the predefined threshold based on their FDD score; and provide a list of the ranked evaluation forms to a supervisor of the contact center agent. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 604 for execution. Such a medium may take many forms, including but not limited to, non-volatile media, volatile media, and transmission media. In various implementations, volatile media includes dynamic memory, such as system memory component 606, and transmission media includes coaxial cables, copper wire, and fiber optics, including wires that include bus 602. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 600. In various other embodiments, a plurality of systems 600 coupled by communication link 620 (e.g., LAN, WLAN, PTSN, or various other wired or wireless networks) may perform instruction sequences to practice the disclosure in coordination with one another. Computer system 600 may transmit and receive messages, data, information and instructions, including one or more programs (i.e., application code) through communication link 620 and communication interface 612. Received program code may be executed by processor 604 as received and/or stored in disk drive component 610 or some other non-volatile storage component for execution.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. An agent evaluation system comprising:
  a processor and a computer readable medium operably coupled thereto, the computer readable medium comprising a plurality of instructions stored in association therewith that are accessible to, and executable by, the processor, to perform operations which comprise:
    receiving a recorded interaction between a customer and a contact center agent;
    retrieving or determining an interaction divergence range for each of a plurality of interaction parameters for the recorded interaction;
    calculating a form divergence determinant (FDD) score for each of a plurality of evaluation forms, wherein the FDD score is based on a value for each of the plurality of interaction parameters associated with each of the plurality of evaluation forms and the interaction divergence range for each of the plurality of interaction parameters for the recorded interaction, and wherein the lower the FDD score, the more suitable an evaluation form is for the recorded interaction;
    filtering out evaluation forms having an FDD score greater than a predefined threshold;
    ranking evaluation forms having an FDD score lower than the predefined threshold based on their FDD score; and
    providing a list of the ranked evaluation forms to a supervisor of the contact center agent.

2. The agent evaluation system of claim 1, wherein the operations further comprise:
receiving, from the supervisor, a selection of one of the listed evaluation forms; and
in response to the selection, providing the selected evaluation form to the supervisor.

3. The agent evaluation system of claim 1, wherein the interaction divergence range is determined, and determining the interaction divergence range for each of the plurality of interaction parameters comprises calculating a confidence interval estimate for each of the plurality of interaction parameters.

4. The agent evaluation system of claim 3, wherein the operations further comprise storing the determined interaction divergence range for each of the plurality of interaction parameters.

5. The agent evaluation system of claim 1, wherein the operations further comprise receiving evaluation form selection rules from the supervisor, wherein the evaluation form selection rules comprise the value for each of the plurality of interaction parameters associated with each of the plurality of evaluation forms.

6. The agent evaluation system of claim 1, wherein the plurality of interaction parameters comprise two or more of: an interaction category, agent skills, a call reason, a behavioral ranking, an interaction duration, an interaction complexity, an interaction channel type, an agent and customer sentiment, and a customer feedback.

7. The agent evaluation system of claim 1, wherein calculating the FDD score comprises:
retrieving the value for each of the plurality of interaction parameters associated with each of the plurality of evaluation forms;
determining a variation of each value for each of the plurality of interaction parameters associated with each of the plurality of evaluation forms from the interaction divergence range for each respective interaction parameter; and
computing a sum of the variations for each of the plurality of evaluation forms.

8. The agent evaluation system of claim 7, wherein calculating the FDD score further comprises assigning a weight to each of the plurality of interaction parameters, wherein computing the sum of the variations comprises applying the weight to each variation.

9. The agent evaluation system of claim 1, wherein the operations further comprise receiving the predefined threshold from the supervisor.

10. A method of facilitating agent evaluations, which comprises:
receiving a recorded interaction between a customer and a contact center agent;
retrieving or determining an interaction divergence range for each of a plurality of interaction parameters for the recorded interaction;
calculating a form divergence determinant (FDD) score for each of a plurality of evaluation forms, wherein the FDD score is based on a value for each of the plurality of interaction parameters associated with each of the plurality of evaluation forms and the interaction divergence range for each of the plurality of interaction parameters for the recorded interaction, and wherein the lower the FDD score, the more suitable an evaluation form is for the recorded interaction;
filtering out evaluation forms having an FDD score greater than a predefined threshold;
ranking evaluation forms having an FDD score lower than the predefined threshold based on their FDD score; and
providing a list of the ranked evaluation forms to a supervisor of the contact center agent.

11. The method of claim 10, which further comprises:
receiving, from the supervisor, a selection of one of the listed evaluation forms; and
in response to the selection, providing the selected evaluation form to the supervisor.

12. The method of claim 10, wherein the interaction divergence range is determined, and determining the interaction divergence range for each of the plurality of interaction parameters comprises calculating a confidence interval estimate for each of the plurality of interaction parameters.

13. The method of claim 10, which further comprises receiving evaluation form selection rules from the supervisor, wherein the evaluation form selection rules comprise the value for each of the plurality of interaction parameters associated with each of the plurality of evaluation forms.

14. The method of claim 10, wherein the plurality of interaction parameters comprise two or more of: an interaction category, agent skills, a call reason, a behavioral ranking, an interaction duration, an interaction complexity, an interaction channel type, an agent and customer sentiment, and a customer feedback.

15. The method of claim 10, wherein calculating the FDD score comprises:
retrieving the value for each of the plurality of interaction parameters associated with each of the plurality of evaluation forms;
determining a variation of each value for each of the plurality of interaction parameters associated with each of the plurality of evaluation forms from the interaction divergence range for each respective interaction parameter;
computing a sum of the variations for each of the plurality of evaluation forms; and
assigning a weight to each of the plurality of interaction parameters, wherein computing the sum of the variations comprises applying the weight to each variation.

16. A non-transitory computer-readable medium having stored thereon computer-readable instructions executable by a processor to perform operations which comprise:
receiving a recorded interaction between a customer and a contact center agent;
retrieving or determining an interaction divergence range for each of a plurality of interaction parameters for the recorded interaction;
calculating a form divergence determinant (FDD) score for each of a plurality of evaluation forms, wherein the FDD score is based on a value for each of the plurality of interaction parameters associated with each of the plurality of evaluation forms and the interaction divergence range for each of the plurality of interaction parameters for the recorded interaction, and wherein the lower the FDD score, the more suitable an evaluation form is for the recorded interaction;
filtering out evaluation forms having an FDD score greater than a predefined threshold;
ranking evaluation forms having an FDD score lower than the predefined threshold based on their FDD score; and
providing a list of the ranked evaluation forms to a supervisor of the contact center agent.

17. The non-transitory computer-readable medium of claim 16, wherein the operations further comprise:
receiving, from the supervisor, a selection of one of the listed evaluation forms; and in response to the selection, providing the selected evaluation form to the supervisor.

18. The non-transitory computer-readable medium of claim 16, wherein the interaction divergence range is determined, and determining the interaction divergence range for each of the plurality of interaction parameters comprises calculating a confidence interval estimate for each of the plurality of interaction parameters.

19. The non-transitory computer-readable medium of claim 16, wherein the plurality of interaction parameters comprise two or more of: an interaction category, agent skills, a call reason, a behavioral ranking, an interaction duration, an interaction complexity, an interaction channel type, an agent and customer sentiment, and a customer feedback.

20. The non-transitory computer-readable medium of claim 16, wherein calculating the FDD score comprises:
retrieving the value for each of the plurality of interaction parameters associated with each of the plurality of evaluation forms;
determining a variation of each value for each of the plurality of interaction parameters associated with each of the plurality of evaluation forms from the interaction divergence range for each respective interaction parameter;
computing a sum of the variations for each of the plurality of evaluation forms; and
assigning a weight to each of the plurality of interaction parameters, wherein computing the sum of the variations comprises applying the weight to each variation.

* * * * *